(12) United States Patent  
Lee

(10) Patent No.: US 7,763,990 B2  
(45) Date of Patent: Jul. 27, 2010

(54) HYBRID GREEN UNINTERRUPTIBLE POWER SYSTEM AND BI-DIRECTIONAL CONVERTER MODULE AND POWER CONVERSION METHOD THEREOF

(75) Inventor: Yu-Lung Lee, Chung Ho (TW)

(73) Assignee: Powertech Industrial Co., Ltd., Taipei Hsien (TW)

( * ) Notice: Subject to any disclaimer, the term of this patent is extended or adjusted under 35 U.S.C. 154(b) by 565 days.

(21) Appl. No.: 11/808,594

(22) Filed: Jun. 12, 2007

(65) Prior Publication Data

US 2008/0238205 A1 Oct. 2, 2008

(30) Foreign Application Priority Data

Mar. 28, 2007 (TW) .............................. 96110774 A

(51) Int. Cl.
*H02J 3/00* (2006.01)
(52) U.S. Cl. .............................. 307/26; 307/23; 307/66
(58) Field of Classification Search .................. 307/23, 307/26, 66

See application file for complete search history.

(56) References Cited

U.S. PATENT DOCUMENTS

2006/0238031 A1* 10/2006 Frey .............................. 307/64

FOREIGN PATENT DOCUMENTS

JP 2001275276 A * 10/2001

* cited by examiner

*Primary Examiner*—Albert W Paladini
*Assistant Examiner*—Daniel Cavallari
(74) *Attorney, Agent, or Firm*—Rosenberg, Klein & Lee

(57) ABSTRACT

A hybrid green uninterruptible power system including an input port, a boost module, a secondary battery, a bi-directional converter module, and an inverter module is provided. The boost module converts an AC utility power into a high voltage DC power. The bi-directional converter module includes a multi-winding transformer for either converting the high-voltage DC power into a low-voltage DC power for charging the secondary battery, or for releasing and boosting the power stored in the secondary battery. The multi-winding transformer further induces an additional DC power when converting the power. Whereby, the hybrid green uninterruptible power system is able to generate the additional DC power all the time and optimizes its energy converting efficiency between the secondary battery and an external device consuming DC power.

10 Claims, 6 Drawing Sheets

HYBRID GREEN UNINTERRUPTIBLE POWER SYSTEM AND BI-DIRECTIONAL CONVERTER MODULE AND POWER CONVERSION METHOD THEREOF

BACKGROUND OF THE INVENTION

1. Field of the Invention

The present invention is related to an uninterruptible power system (UPS), and more particularly to a hybrid green uninterruptible power system which concurrently has an AC output port and a DC output port, a bi-directional converter module and a power conversion method thereof.

2. Description of Related Art

A UPS (Uninterruptible Power System) is a protection device for computer equipment, monitoring instruments, fire-fighting equipment, and medical equipment. When the supply of AC utility power is interrupted, the UPS acts as a substitute for the AC utility power to ensure the equipment/instrument does not shutdown or become damaged owing to the instantaneous power disconnection. Alternatively, when the power source becomes invalid, for example, an irregular voltage (such as over voltage and under voltage), or a transient voltage surge caused by a lightning strike, the quality of the power for supporting normal operation of the equipment/instrument is influenced. IN such cases, a UPS can help output clean AC power.

Please refer to FIG. 1 which shows a schematic view of a conventional uninterruptible power system (UPS) 10. As shown in FIG. 1, the UPS 10 includes an input port 100, a relay 102, a battery charger module 106, a secondary battery 108, a boost module 110, an inverter module 112, a monitor module 120, and an output port 104. The input port 100 is coupled to the utility power network for receiving an AC utility power, and the output port 104 outputs an AC power to the external load.

The UPS 10 in FIG. 1 is called an off-line UPS or a passive standby UPS. It is characterized by a relay 100 that switches the power supply source. When the AC utility power operates normally, the relay 100 stays in an On/Close state so that AC utility power is directly provided to the load through the output port 102. When the AC utility power becomes invalid, the relay 100 is switched to an Off/Open state, so that an AC power produced by the UPS 10 is provided to the load. In FIG. 1, the transmission paths A and B respectively represent the power transmission paths when the AC utility power is normal and invalid.

The input port 100 is connected to the utility power network for receiving AC utility power. The monitor module 120 is coupled to the input port 100 for detecting whether the electrical characteristics of the inputted AC utility power is normal or abnormal so as to control the operation of the UPS 10. When the electrical characteristics of the AC utility power are normal, the relay 100 stays in the On/Close state, and then a battery charger module 106 converts the AC utility power into DC power and also steps down the DC power, so as to charge the secondary battery 108. Once the AC utility becomes invalid, the relay 100 is switched to the Off/Open state and the power of the secondary battery 108 is released. The boost module 110 also boosts the output DC power released from the secondary battery 108. Next, the inverter module 112 inverts the high-voltage DC power outputted by the boost module 110 into AC power with the utility power frequency by use of an internal bridge circuit so as to supply AC power to the load through the output port 104.

Apart from the off-line UPS described above, another commonly used UPS is an on-line UPS. The internal connection among modules of an on-line UPS is different from that of an off-line UPS. In an on-line UPS AC utility power is converted into DC power which the DC power is used to charge the secondary battery and also be inverted into AC power with the utility power frequency by an inverter module. Once the AC utility power is invalid, the DC power stored in the secondary battery is released and the released DC power will be boosted by the boost module and further transformed into AC power by the inverter module.

According to the above description, it is realized that in a UPS, the boost module, which is used for converting high energy voltage, only works when the AC utility power becomes invalid. In particular, in off-line UPS, the boost module and the inverter module both remain idle as the AC utility power operates normally. Obviously this is a waste of resources. Furthermore, there are many digital devices, including notebooks, mobile phones, and portable DVD players, which operate with a DC power supply. Once the normal power supply is interrupted to these devices, AC power outputted by the UPS has to be converted into DC power by use of the voltage converter. Therefore, the power loss not only occurs as the power outputted from the secondary battery is internally converted into the AC power, but also occurs as the AC power is once again converted by an external voltage converter to change back to DC power. Thereby, usually, only 50% to 60% of the power released from the secondary battery can be transmitted to the device. Obviously this is actual waste of energy and does not meet the requirement of environmental consciousness.

SUMMARY OF THE INVENTION

The object of the present invention is to provide a hybrid green uninterruptible power system, a bi-directional converter, and a power conversion method thereof, wherein by utilizing a multi-winding transformer to convert power bi-directionally, the DC power, which is additionally produced from induction, can be outputted regardless of whether the utility power is normal or invalid.

The present invention discloses a hybrid green uninterruptible power system, including an input port, a secondary battery, a boost module, a bi-directional converter module, and an inverter module. The input port receives an AC utility power. The boost module converts the AC utility power into a high voltage DC power. The bi-directional converter module is coupled between the boost module and the secondary battery. The bi-directional converter module has a multi-winding transformer which bi-directionally converts the high voltage DC power into a low voltage DC power for charging the secondary battery, or releases the power from the secondary battery and boosts thereof. Simultaneously, the multi-winding transformer induces an additional DC power. The inverter module is coupled to the bi-directional converter module for converting the boosted power, which is released from the secondary battery by the bi-directional converter module, into an AC power. Whereby, the hybrid green uninterruptible power system induces the additional DC power regardless of whether the AC utility power is normal or invalid.

In one embodiment of the present invention, the hybrid green uninterruptible power system is an off-line UPS (uninterruptible power system) or a passive standby UPS.

In another embodiment of the present invention, the hybrid green uninterruptible power system is an on-line UPS.

The present invention further discloses a power conversion method for controlling a hybrid green uninterruptible power system having an AC power supply to output DC power, wherein the hybrid green uninterruptible power system receives an AC utility power and has a secondary battery. The method includes steps of providing the hybrid green uninterruptible power system having a multi-winding transformer coupled to the secondary battery; according to the state of the AC utility power is normal or invalid, stepping down the AC utility power via the multi-winding transformer in order to charge the secondary battery, or release the power from the secondary battery, and simultaneously, inducing an additional DC power through the power conversion of the multi-winding transformer; and outputting the additional DC power.

The present invention further discloses a bi-directional converter module for being coupled between a first power port and a second power port which is capable of bi-directional power transmission. The bi-directional module includes a multi-winding transformer and a high frequency switch circuit. The multi-winding transformer module has two primary coils and an additional coil, wherein the two primary coils are respectively coupled to the first power port and the second power port. The high frequency switch circuit is coupled to the two primary coils for controlling the multi-winding transformer to transmit the power provided by the first power port to the second power port, or to transmit the power provided by the second power port to the first power port. When the multi-winding transformer converts the power, the additional coil induces an additional DC power simultaneously.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

The present invention provides a hybrid green uninterruptible power system, which utilizes a multi-winding transformer to process an internal bi-directional DC power high/low voltage conversion, so as to induce an additional DC power as converting the power, such that regardless of whether an AC utility power is normal or invalid, the hybrid green uninterruptible power system is able to provide the additional DC power to supply an external device all the way.

Figure 1:
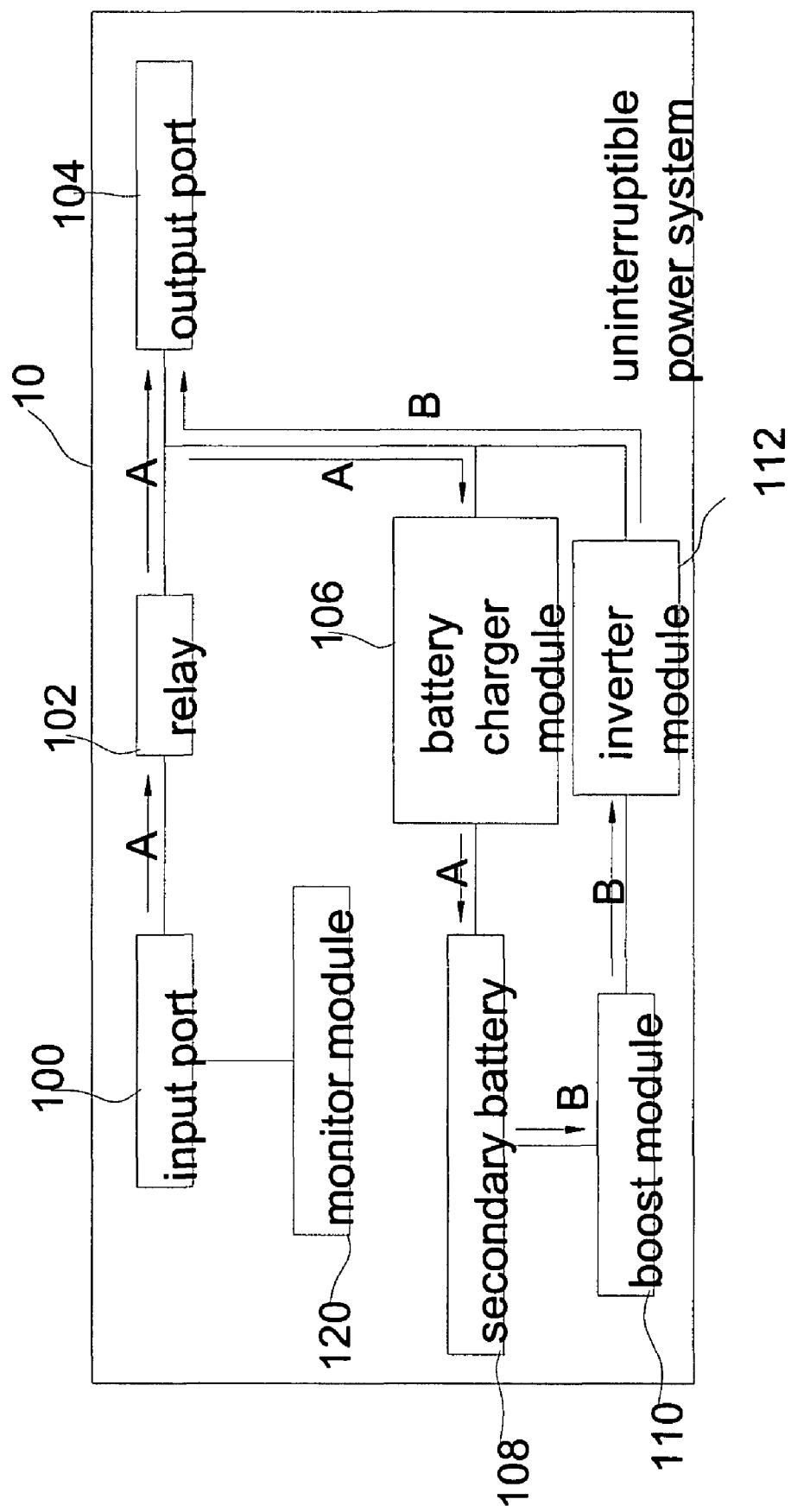
FIG. 1 is a schematic view of a conventional uninterruptible power system.
Figure 2:
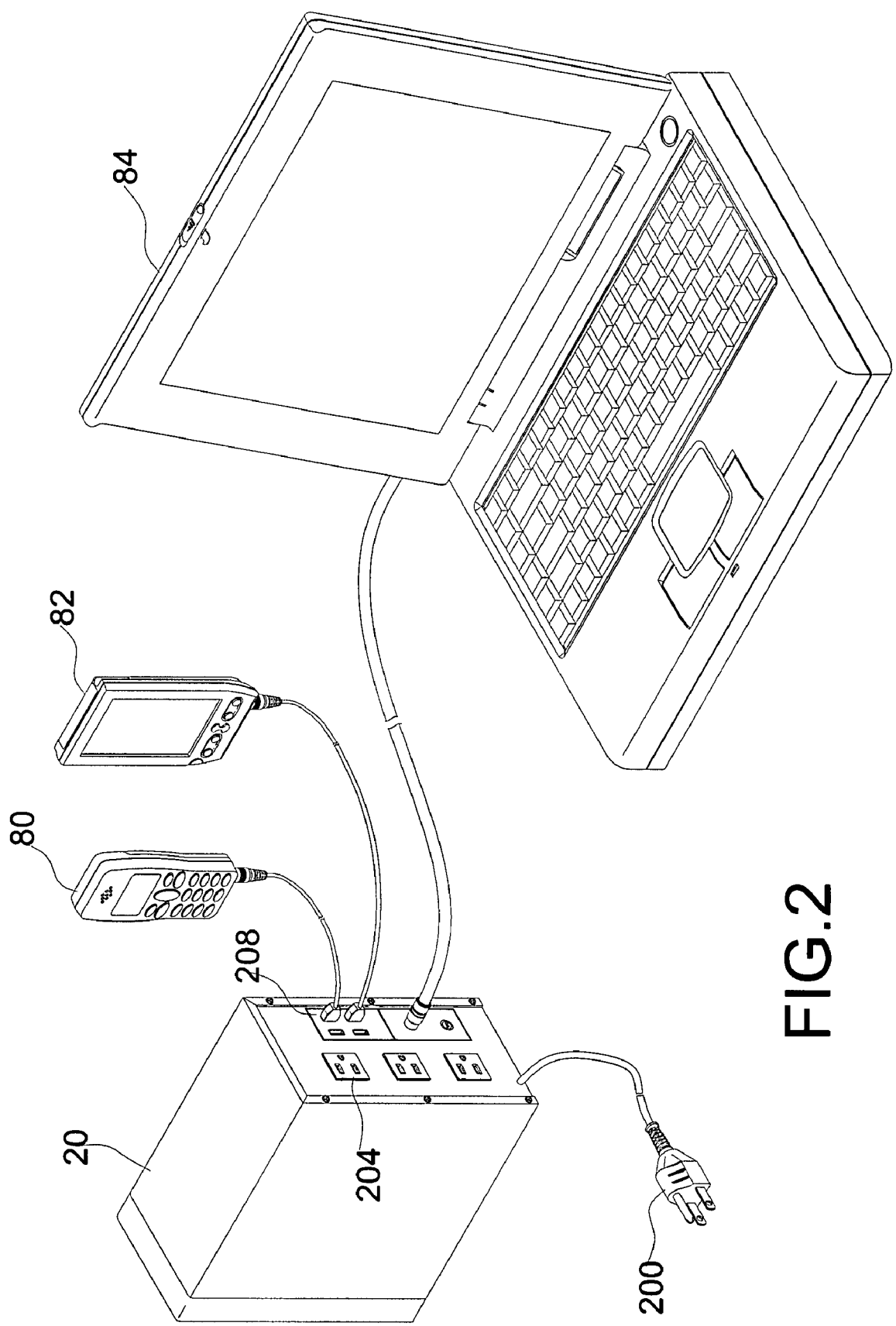
FIG. 2 is a schematic view showing a hybrid green uninterruptible power system according to the present invention.

Firstly, the basic concept of the present invention should be explained. Please refer to FIG. 2, which is a schematic view showing the hybrid green uninterruptible power system according to the present invention. As shown in FIG. 2, the hybrid green uninterruptible power system 20 has an input port 200, a plurality of AC power output ports 204 and a plurality of DC power output ports 208, wherein the input port 200 is connected with the utility power network for receiving an AC utility power. Moreover, the hybrid green uninterruptible power system 20 has a secondary battery mounted inside and charged by DC power converted from AC utility power. Simultaneously, a plurality of additional DC power are provided to the DC power output ports 208 individually. Therefore, when AC utility power is interrupted or an irregular voltage occurs, the secondary battery releases power, and the inverter inside the hybrid green uninterruptible power system 20 inverts power from the secondary battery into AC power so that the hybrid green uninterruptible power system 20 can provide the AC power to the external load via the AC power output ports 204 and simultaneously provide one or more sets of additional DC power with the DC power output ports 208.

Based on the functions described above, the secondary battery in the hybrid green uninterruptible power system 20 has to be connected with a high frequency isolated DC voltage converter in order to perform the bi-directional high/low voltage conversion. The applicant utilizes a multi-winding transformer having multiple coils to achieve this bi-directional voltage conversion so that while the multi-winding transformer converts the power, one or more sets of additional DC power will be outputted to the load which employs DC power, such as the devices 80, 82, 84 shown in FIG. 2 via the DC power output ports 208.

Furthermore, the number of induction coils and the turns of each induction coil of the multi-winding transformer can be changed so as to alter the number of sets of the provided additional DC power with the required voltage value. Besides, the DC power output port can be implemented as a coaxial terminal plugging hole, a USB slot, or other standard types, so as to meet the requirement of voltage values and connectors of the devices 80, 82 and 84.

Figure 3:
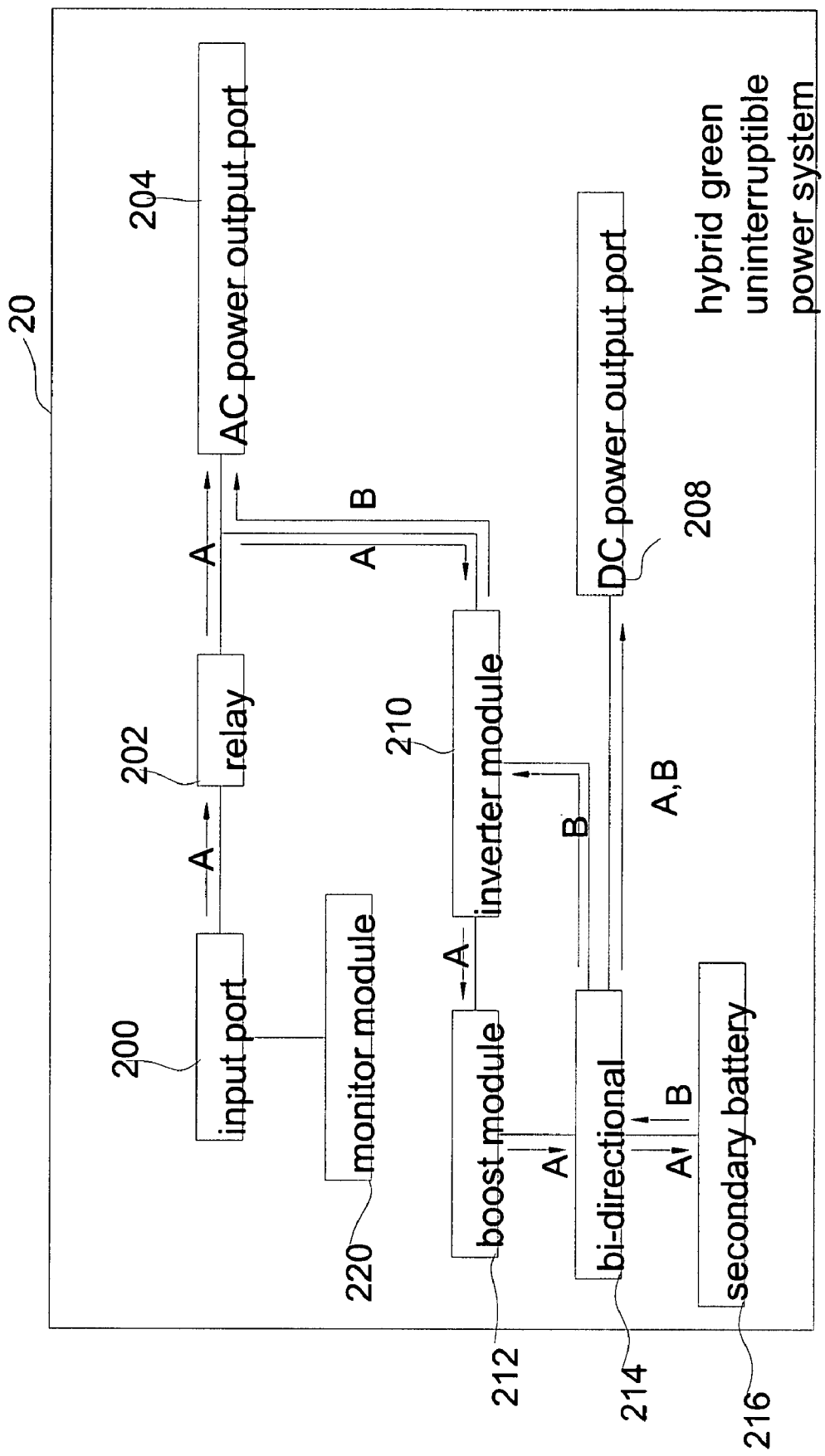
FIG. 3 is a schematic view showing the architecture of the hybrid green uninterruptible power system in a first embodiment according to the present invention.

Please refer to FIG. 3, which is a schematic view showing the system architecture of the hybrid green uninterruptible power system in a first embodiment according to the present invention. In this embodiment, the hybrid green uninterruptible power system 20 belongs to a category of off-line UPSs (also known as passive standby UPSs). As shown in FIG. 3, the hybrid green uninterruptible power system 20 includes an input port 200, a relay 202, an inverter module 210, a boost module 212, a bi-directional converter module 214, a secondary battery 216, a monitor module 220, an AC power output port 204, and a DC power output port 208.

The output port 200 is connected with the utility power network for receiving an AC utility power. The monitor module 220 is coupled to the input port 200, for detecting the state of the inputted AC utility power. Therefore, by detecting the electrical characteristics of the AC utility power, it can decide if the power supply has been interrupted or if the voltage is irregular so as to control the operation of each module inside the hybrid green uninterruptible power system 20. The relay 202 is coupled between the input port 200 and the AC power output port 204 and is controlled by the monitor module 220 so as to open or close the loop between the input port 200 and the AC power output port 204. A characteristic of the off-line UPS is that when the AC utility power is regular the relay 202 is controlled to remain in the On/Close state so that the AC power output port 204 is connected with the input port 20 for outputting the AC utility power to the load. Once the AC utility power is invalid the relay 202 is switched to the Off/Open state, so that the AC power generated from the hybrid green uninterruptible power system 20 is outputted to the load through the AC power output port 204.

In FIG. 3 the transmission paths A, B respectively display the power transmission directions of the normal and invalid states of the AC utility power. When the AC utility power operates normally, the AC utility power inputted from the input port 200 can be transmitted to the AC power output port 204. Meanwhile, the AC utility power inputted from the input port 200 can also be transmitted to the inverter module 210 through the relay 202. Because the inverter module 210 includes a bridge circuit therein, as the characteristics of the AC utility power is irregular, the bridge circuit acts as a rectifier and thus the AC utility power is rectified before outputted. The boost module 212 is coupled to the inverter module 210 for converting the rectified AC utility power into DC power and subsequently boosting the rectified DC power. The bi-directional converter module 214 is coupled between the boost module 212, the inverter module 210, and the secondary battery 216. The bi-directional converter module 21 includes a multi-winding transformer (not shown in FIG. 3) so as to achieve a power conversion mechanism. When the AC utility power is normal the bi-directional converter module 214 converts a high voltage DC power boosted by the boost module 212 into a low voltage DC power so that the converted DC power meets to the required voltage rating for charging the secondary battery 216. Generally, according to the voltage value (110 Volts or 220 Volts) of the inputted AC utility power, the boost module 212 converts the AC utility power into DC power of approximately 200 or 400 Volts. However, since the charge voltage rating of the secondary battery 216 ranges from 6 to 48 Volts, the high voltage DC power boosted by the boost module 212 has to be converted to meet the voltage rating of the secondary battery 216. Besides, the multi-winding transformer induces an additional DC power, which is then transmits to the external device through the DC power output port 208 coupled to the bi-direction converter module 214.

When the AC utility power is invalid the monitor module 220 controls the relay 202 switched to the Off/Open state so that the power transmission path turns into the path B. At this time, the bi-directional converter module 214 starts converting power in another direction. Owing to the operation of the bi-directional converter module 214, the storage power of the secondary battery 216 is drawn out and the voltage of the DC power released from the secondary battery 214 is converted into a high voltage and then transmitted to the inverter module 210. Simultaneously, an additional DC power is induced to be outputted to the DC power output port 208. The inverter module 210 utilizes a bridge circuit implemented therein to convert the high voltage DC power outputted by the bi-directional converter module 214 into the AC power meeting the utility power frequency so as to output the AC power to the load through the AC power output port 201.

Therefore, regardless of whether the state of the AC utility power is normal or invalid, the hybrid green uninterruptible power system 20 can induce the additional DC power that can then be provided to the external device.

Figure 4:
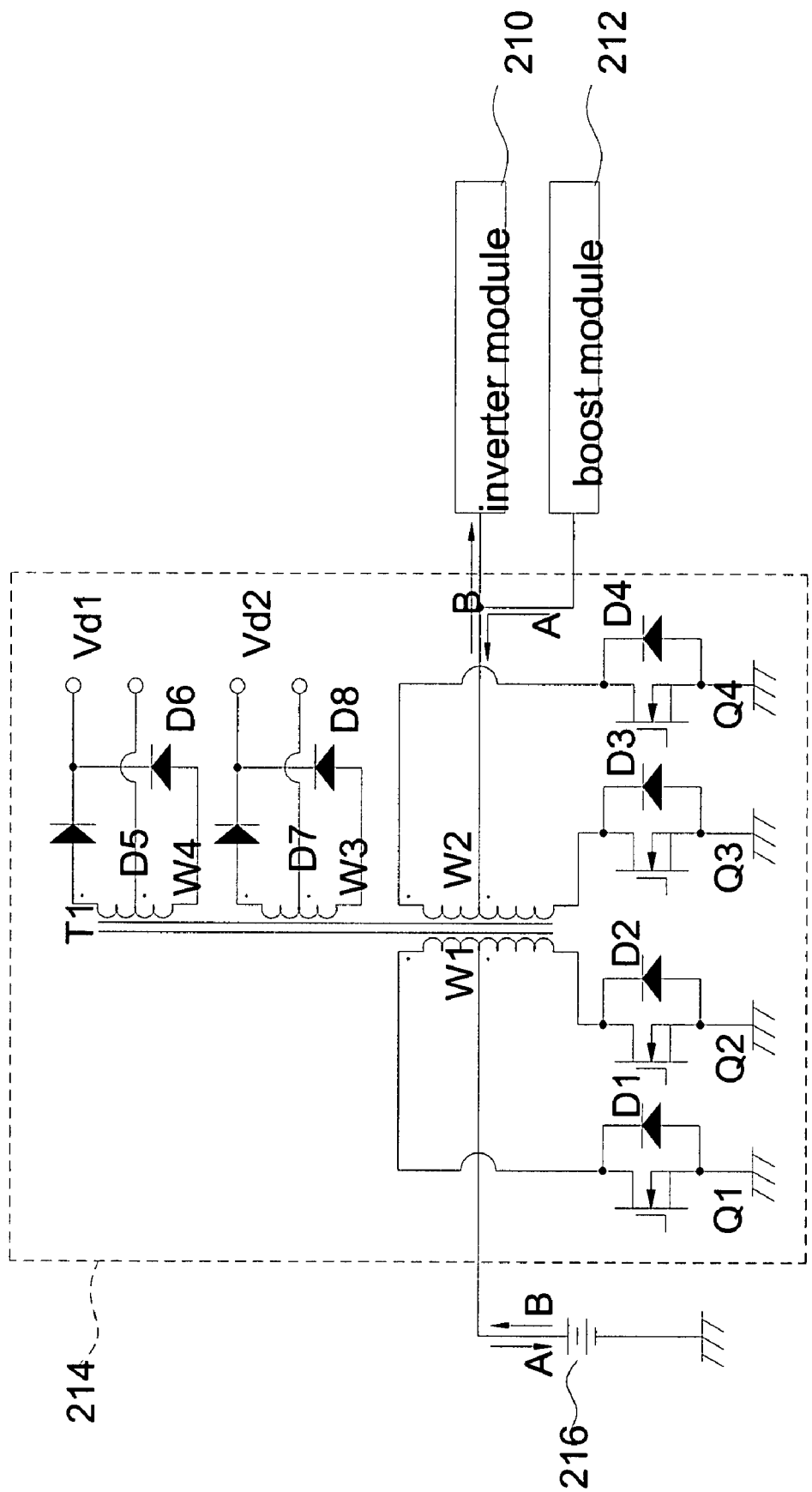
FIG. 4 is a circuit block of a bi-directional conversion module according to an embodiment of the present invention.

Following is a further explanation for the bi-directional converter module 214. Please refer to FIG. 4, which shows a circuit block of the bi-directional converter module 214 in FIG. 3 according to an embodiment of the present invention. In FIG. 4, the bi-directional converter module 214 includes a multi-winding transformer T1, four transistors Q1~Q4, and eight diodes D1~D8. The multi-winding transformer T1 has four coils W1~W4, wherein the coils W1, W2 are the primary coils and the coil W2 is coupled to the inverter module 210 and the boost module 212. The coil W1 is coupled to the secondary battery 216. The transistors Q1~Q4 and the diodes D1~D4 constitute a high frequency switch circuit coupled to the primary coils W1, W2 of the multi-winding transformer T1. In FIG. 4, the multi-winding transformer T1 and the high frequency switch circuit constitute a push-pull high frequency isolated DC voltage converter circuit, wherein the transistors Q1~Q4 are used as switch elements and by controlling the operating states of the transistors Q1~Q4, the transmission direction of the power can be controlled.

To control the power transmission path along path A for converting the high voltage of the boost module 212 into the low voltage DC power for charging the secondary battery 216, the transistors Q3, Q4 next to the coil W2 are controlled to switch between on and off states with high frequency. At this time, a low voltage DC power is induced within the coil W1 for charging the secondary battery 216. To control the power transmission path along path B for releasing the power stored in the secondary battery 216, the transistor Q1, Q2 next to the coil w1 are controlled to switch between on and off states with high frequency. At this time, a high voltage is induced within the coil W2 for transmission to the inverter module 210.

While the multi-winding transformer T1 converting the power along the transmission path A or B, the coils W3 and W4 respectively induces an additional DC power which is then rectified by the transistors D5~D8 for transmission to the DC power output port 208 so as to supply the external device with power. Here, the induced voltages Vd1, Vd2 respectively of the coils W3, W4 can be changed by altering the turns of the coils W3, W4. It should also be noted that there are still many other kinds of high frequency isolated DC voltage conversion circuits, such as, flyback, full-bridge and half-bridge DC voltage conversion circuits. All of there circuits can be applied to the present invention. FIG. 4 only uses the push-pull DC voltage conversion circuit as an example for explanation, and not for limitation.

It should be noted that the bi-directional converter module 214 utilizes the multi-winding transformer T1 to carry out a bi-directional conversion and to induce an additional DC power. Except for the hybrid green uninterruptible power system 20 according to the present invention, the bi-directional converter module 214 can also be applied to other power supplies including power systems only by providing a bi-directional converter module with a multi-winding transformer and a high frequency switch circuit. The multi-winding transformer has two primary coils and one additional coil. The two primary coils are respectively coupled to a first power port and a second power port which are capable of bi-directionally transmitting power. The high frequency switch circuit is coupled to the two primary coils. The high frequency switch circuit controls the multi-winding transformer to transmit power outputted by the first power port to the second power port, or transmit power outputted by the second power port to the first power port. When the multi-winding transformer converts the power, the additional coil induces an additional DC power.

Figure 5:
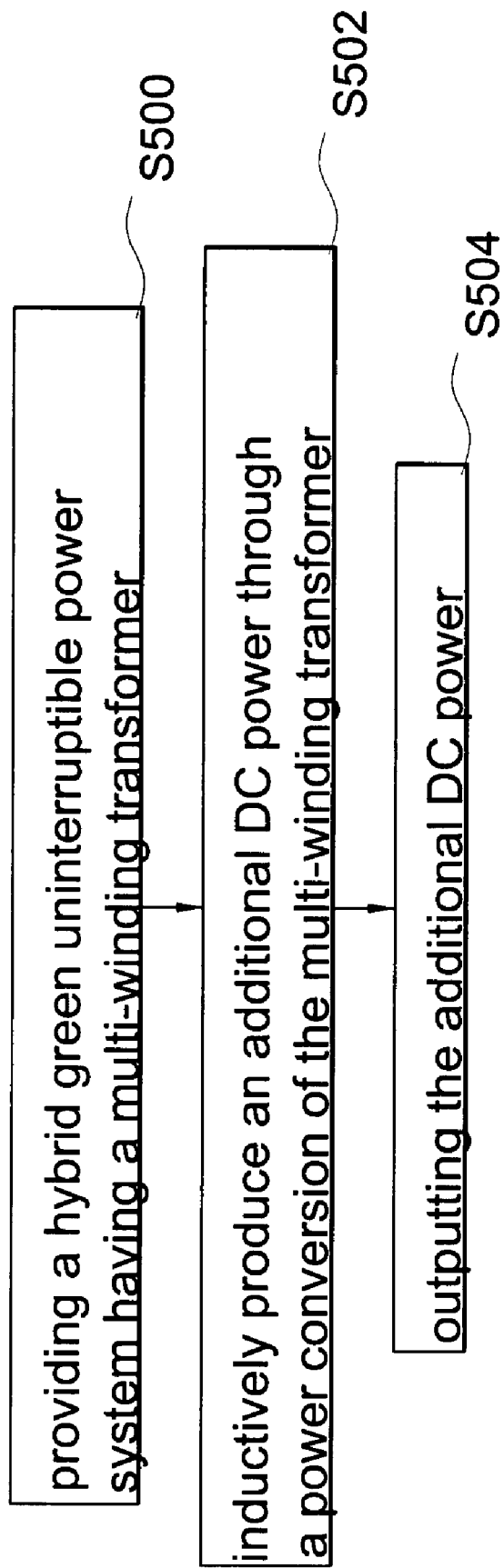
FIG. 5 is a flow chart showing a power conversion method of the hybrid green uninterruptible power system according to the present invention.

The power conversion method is described as followed. Please refer to FIG. 5 which is a flow chart showing the power conversion steps according to the present invention. This method is suitable for the hybrid green uninterruptible power system 20 whose architecture can be referenced in FIGS. 3 and 4. The power conversion method includes steps of:

First, providing a multi-winding transformer T1 to the hybrid green uninterruptible power system 20 for coupling to the secondary battery 216 (Step S500);

Second, in accordance with the state of the AC utility power is normal or invalid, stepping down the AC utility power via the multiple-winding transformer T1 in order to charge the secondary battery 216 or releasing the power from the secondary battery 216 by the multi-winding transformer T1, and simultaneously, inducing an additional DC power through the power conversion of the multi-winding transformer T1 (Step S502); and Finally, outputting the additional DC power (Step S504).

Through the above-described power conversion method, regardless of whether the AC utility power is in a normal or an invalid state, the hybrid green uninterruptible power system 20 can provide the additional DC power. Furthermore, this method can also be implemented to an on-line UPS.

Figure 6:
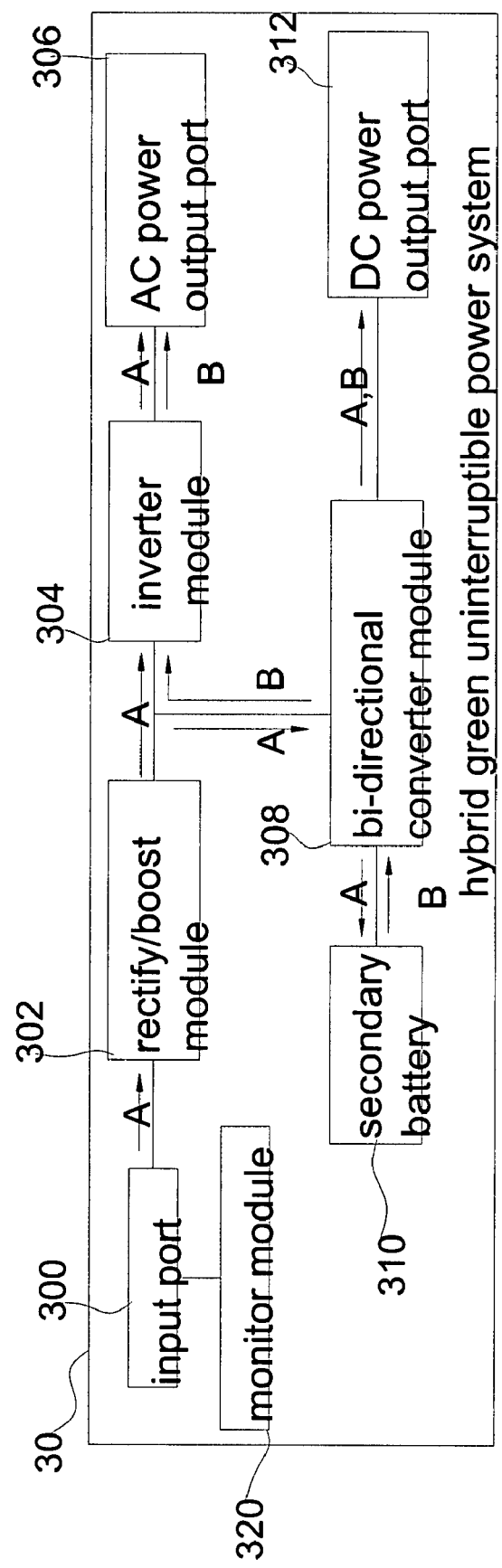
FIG. 6 is a schematic view showing the architecture of hybrid green uninterruptible power system in a second embodiment according to the present invention.

Please refer to FIG. 6 which is a schematic view showing the architecture of a hybrid green uninterruptible power system 30 in a second embodiment of the present invention. In this embodiment, the hybrid green uninterruptible power system 30 is an on-line UPS. As shown, the hybrid green uninterruptible power system 30 includes an input port 300, a rectify/boost module 302, an inverter module 304, a bi-directional converter module 308, a secondary battery 310, a monitor module 320, an AC power output port 306, and a DC power output port 312. The input port 300 is used to connect with the utility power network for receiving an AC utility power. The monitor module 320 is coupled to the input port 300 for detecting whether the inputted AC utility power is normal or invalid so as to control the operation of the hybrid green uninterruptible power system 30. In FIG. 6, transmission paths A, B respectively represent the power transmission paths of normal and invalid AC utility power.

The rectify/boost module 302 is coupled to the input port 300, so that when the AC utility power operates normally, the rectify/boost module 302 rectifies and filters the AC utility power for converting the AC utility power to a DC power and further boosting the DC power. The inverter module 304 is coupled to the rectify/boost module 302 for converting the boosted DC power of the rectify/boost module 302 into the AC power meeting the utility power frequency. The AC power output port 306 is coupled to the inverter module 304 for outputting the AC power generated by the inverter module 304 to the external load. The bi-directional converter module 308 is coupled between the rectify/boost module 302, the secondary battery 310, and the DC output port 312. The converter module 308 includes a multi-winding transformer which can convert the high voltage DC power outputted by the rectify/boost module 302 into low voltage DC power in order to meet the voltage rating for charging the secondary battery 310. The converter module 308 can also induce an additional DC power that can be provided to the external device via the DC power output port 312.

When the AC utility power is invalid the bi-directional converter module 308 operates a reverse directional power transmission for drawing out the power stored in the secondary battery 310 and converting the low voltage DC power from the secondary battery 310 into high voltage DC power. Next, the high voltage DC power is transmitted to the inverter module 304 for converting the DC power into the AC power with the utility power frequency. The AC power is then transmitted to the load via the AC power output portion 306. While the multi-winding transformer of the bi-directional converter module 308 carries out the power conversion, an additional DC power is also induced for providing power to the device connected to the DC output port 312.

Moreover, the present invention utilizes the bi-directional converter module to induce DC power for providing power to the external device so that the conversion efficiency of the stored energy in the secondary battery for transmission to the external device is over 80%. However, conventionally, the voltage converter has to be connected between the UPS and the external device for once again converting the AC power converted from the battery power into DC power provided to the device, so that only 50% to 60% of energy is utilized. Therefore, the present invention wastes less energy than the prior art.

Furthermore, since the rectification, boost mechanism, the DC/AC conversion mechanism, and the other power factor conversion mechanisms in a UPS are well known to one skilled in the art, the application will not provide further unnecessary details related thereto.

In accordance with the embodiments described above, the hybrid green uninterruptible power system, the bi-directional converter module thereof and the power conversion method which are disclosed in the present invention are characteristic of utilizing the multi-winding transformer implemented inside the bi-directional converter module for converting power. Therefore, regardless of whether the AC utility power is normally inputted or invalid, an additional DC power can be induced for provision to the external device. Consequently, the hybrid green uninterruptible power system concurrently having an AC power output port and a DC power output port according to the present invention can meet different demands and significantly improve the efficiency of energy conversion between the UPS battery and the external device, thereby less energy is wasted during converting power.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the additional claims are expressed.

What is claimed is:

1. A hybrid green uninterruptible power system, comprising:
    an input port, for receiving an AC utility power;
    a secondary battery;
    a boost module, for converting the AC utility power into a high voltage DC power;
    a bi-directional converter module, coupled between the boost module and the secondary battery, wherein the bi-directional converter module has a multi-winding transformer, which bi-directionally converts the high voltage DC power into a low voltage DC power for charging the secondary battery, or releases the power from the secondary battery and boosts thereof, and simultaneously, the multi-winding transformer induces an additional DC power; and
    an inverter module, coupled to the bi-directional converter module for converting the boosted power, which is released from the secondary battery by the bi-directional converter module, into an AC power,
    whereby the hybrid green uninterruptible power system induces the additional DC power regardless of whether the AC utility power is normal or invalid.

2. The hybrid green uninterruptible power system as claimed in claim 1, further comprising:
    an AC power output port, coupled to the inverter module for outputting the AC power; and
    a DC power output port, coupled to the bi-directional converter module for outputting the additional DC power.

3. The hybrid green uninterruptible power system as claimed in claim 1, further comprising a monitor module, for detecting whether the AC utility power is in a normal or invalid state, so as to control an operation of each module in the hybrid green uninterruptible power system.

4. The hybrid green uninterruptible power system as claimed in claim 1, wherein the bi-directional converter module comprises a DC voltage conversion circuit, which includes the multi-winding transformer.

5. The hybrid green uninterruptible power system as claimed in claim 4, wherein the DC voltage conversion circuit is selected from the group consisting of a push-pull DC voltage conversion circuit, a flyback DC voltage conversion circuit, a full-bridge DC voltage conversion circuit, and a half-bridge DC voltage conversion circuit.

6. The hybrid green uninterruptible power system as claimed in claim 1, wherein the hybrid green uninterruptible power system is an off-line UPS or a passive standby UPS.

7. The hybrid green uninterruptible power system as claimed in claim 6, further comprising a relay and an AC power output port, wherein the relay is coupled between the input port and the AC power output port, for opening or closing a loop between the input port and the AC power output port according to the state of the AC utility power.

8. The hybrid green uninterruptible power system as claimed in claim 7, wherein the inverter module is coupled to the relay and the boost module is coupled to the inverter module, the inverter module comprises a bridge circuit, when the AC utility power is normal, the bridge circuit rectifies the AC utility power, further outputs the rectified power to the boost module, and the boost module boosts the rectified power into the high voltage DC power.

9. The hybrid green uninterruptible power system as claimed in claim 1, wherein the hybrid green uninterruptible power system is an on-line UPS.

10. The hybrid green uninterruptible power system as claimed in claim 9, wherein the boost module is coupled to the input port for rectifying and boosting the AC utility power to become the high voltage DC power, and the inverter module is coupled to the boost module for converting the high voltage DC power into the AC power.

* * * * *